Patented Sept. 20, 1932

1,878,699

UNITED STATES PATENT OFFICE

WINFRID HENTRICH AND MAX HARDTMANN, OF WIESDORF-ON-THE-RHINE, JOSEF HILGER, OF COLOGNE-MULHEIM, AND WERNER ZERWECK, OF FRANKFORT-ON-THE-MAIN-FECHENHEIM, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

MANUFACTURE OF 1-HALOGEN-ARYL-THIAZOLES

No Drawing. Application filed April 25, 1929, Serial No. 358,156, and in Germany April 30, 1928.

The present invention relates to a process of preparing 1-halogen-aryl-thiazoles, more particularly it relates to compounds of the general formula:

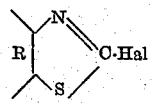

wherein R stands for an aromatic ring which may be substituted by any substituent, and "Hal" stands for a chlorine or bromine atom.

According to our invention, 1-halogen-benzothiazoles and 1-halogen-naptho-thiazoles are obtainable in excellect yields by reacting upon a 1-hydroxy-benzothiazole or a 1-mercapto-benzothiazole (compare for instance Teppema, Journal of the American Chem. Soc., volume 49, page 1753 and 1780 (1927)) or the corresponding naphtho-thiazoles, said compounds being represented by the general formula:

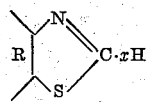

wherein R stands for an aromatic ring, such as a benzene or naphthalene nucleus, which may be substituted by alkyl, a nitro or carboxylic acid group and $x$ stands for an oxygen or sulfur atom, with a phosphorus halogen compound of the formula: $P \cdot Hal_5$, wherein "Hal" stands for a chlorine or bromine atom, two halogen atoms of which may be substituted by a sulfur or oxygen atom, for example phosphorus pentachloride, phosphorus pentabromide, phosphorus-oxychloride and phosphorus sulfo-chloride at a temperature from about 80° C., to about 100° C., or 130° C. respectively in the case of the phosphor-bromine compounds, and if desired in an inert organic solvent, such as chlorobenzene and solvent naphtha.

Since the halogen in the 1-position can be exchanged very readily against any desired compounds, possessing a mobile hydrogen atom attached to, for example a nitrogen, oxygen, sulfur or carbon atom, a great number of technically valuable substances become readily accessible by the new process. These substances are intended to find application as intermediate products for dyestuffs, for pharmaceutical preparations or for combating pests, as accelerators for vulcanization and the like.

The invention is illustrated by the following examples, but is not restricted thereto:

*Example 1.*—167 parts by weight of 1-mercaptobenzothiazole

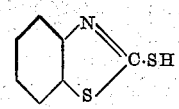

are heated with 230 parts by weight of phosphorus pentachloride and 100—200 parts by weight of phosphorus sulfo chloride or phosphorus oxychloride (as diluting agent) for 3 hours at 90–100° C. After this time the thiazole and the phospohrus pentachloride go completely into solution. The solution is distilled in vacuo and the addition compound of chlorothiazole and phosphorus chloride, which appears as intermediate product, decomposes at a bath temperature of 100–200° C. The mixture of phosphorus sulfo chloride and 1-chloro-benzothiazole, which passes over, is now distilled under ordinary pressure. The phosphorus sulfo chloride distils up to 135° C., then a small amount of undecomposed addition compounds follows, which can be decomposed by a repeated distillation, and at 248° C. the 1-chloro-benzothiazole distils. The total yield amounts to over 95%.

*Example 2.*—151 parts by weight of 1-hydroxy-benzothiazole

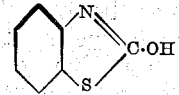

are heated with 230 parts by weight of phosphorus pentachloride and 100–200 parts by weight of phosphorus oxychloride (as diluting agent) for 3 hours at 90–100° C. After this time the thiazole and the phosphorus pentachloride go completely into solution. The solution is distilled in vacuo and the addition compound of chloro-thiazole and phosphorus chloride, which appears as intermediate product, decomposes at a bath temperature of 100–200° C. The mixture of phosphorus oxychloride and 1-chloro-benzothiazole, which passes over, is now distilled under ordinary pressure. The phosphorus oxychloride distils up to 135° C., then a small amount of undecomposed addition compounds follows, which can be decomposed by a repeated distillation and at 248° C. the 1-chloro-benzothiazole distils. The total yield amounts to over 95%.

*Example 3.*—181 parts by weight of 4-methyl-1-mercaptobenzothiazole (Teppema, loc. cit.)

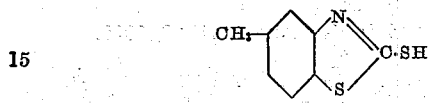

are heated with 225 parts by weight of phosphorus pentachloride—(if desired with the addition of phosphorus sulfo-chloride)—for 3-4 hours at about 100° C. After this time the reaction mixture forms a melt, on which only a few solid particles still float. Prolonged heating increases the undissolved portion and reduces the wield more and more in consequence of the occurrence of a bye-reaction. The melt is first distilled in vacuo, then fractionation is again effected at ordinary pressure. The 4-methyl-1-chlorobenzothiazole solidifies in the receiver. It melts at 40–47° C. Its boiling point lies at 266° C. and in the vacuum of the water pump it boils at 132° C. The yield is almost theoretical.

According to the process of this example other 1-cholorbenzothiazoles with an alkyl group substituted in the benzene nucleus can also be obtained.

*Example 4.*—212 parts by weight of the 5-nitro-1-mercaptobenzothiazole which is readily obtainable by nitration of 1-mercaptobenothiazole (c. f. Teppema, loc. cit.) are heated with 230 parts by weight of phosphorus pentachloride and 200 parts by weight of phosphorus sulfo chloride for 6 hours at 95° C. After this time solution is complete. The melt is now heated in vacuo to a bath temperature of 180° C. in order to eliminate phosphorus chloride. The residue is dissolved in hot alcohol and filtered. On cooling the 5-nitro-1-chloro-benzothiazole separates. A further portion can be recovered from the mother liquor. The 5-nitro-1-chlorobenzothiazole melts at 190° C. and when heated with aniline, it gives a phenylamino compound of the melting point 247° C. Its properties are those of the substance obtained by Hofmann (loc. cit.) by nitration of "cholorphenyl mustard oil" (that is 1-chlorobenzothiazole).

According to the process of this example the corresponding cholorbenzothiazoles substituted with halogen in the benzene nucleus or naphthalene nucleus can be obtained; in an analogous manner the 1-cholorbenzothiazole-4-carboxylic acid chloride can be obtained by the action of rather more than two molecules of phosphorus pentachloride on the carboxylic acid of the formula:

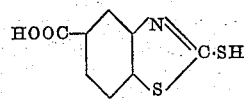

described by Teppema (loc. cit.)

We claim:

1. The process which comprises reacting upon a compound of the general formula:

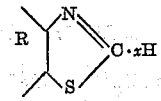

wherein R stands for an aromatic nucleus which may be substituted by alkyl, a nitro or carboxylic acid group and $x$ stands for an oxygen or sulfur atom with a phosphorus halogen compound of the formula: $P \cdot Hal_5$, wherein "Hal" stands for a chlorine or bromine atom, two of which halogen atoms may be substituted by an atom of the group consisting of oxygen and sulfur, at a temperature between 80 and 130° C.

2. The process which comprises reacting upon a compound of the general formula:

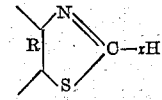

wherein R stands for an aromatic nucleus which may be substituted by alkyl, a nitro or carboxylic acid group and $x$ stands for an oxygen or sulfur atom with a phosphorus halogen compound of the formula: $P \cdot Hal_5$, wherein "Hal" stands for a chlorine or bromine atom, two of which halogen atoms may be substituted by an atom of the group consisting of oxygen and sulfur, at a temperature between 80 and 130° C. with the addition of a solvent.

3. The process which comprises reacting upon a compound of the general formula:

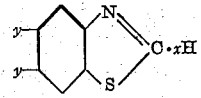

wherein $y$ stands for hydrogen, alkyl, a nitro group or a carboxylic acid group and $x$ stands for an oxygen or sulfur atom, with a phosphorus halogen compound of the formula: $P \cdot Hal_5$, wherein "Hal" stands for a chlorine or bromine atom, two of which halogen atoms may be substituted by an atom of the group consisting of oxygen and sulfur, at a temperature between 80 and 130° C.

4. The process which comprises reacting upon a compound of the general formula:

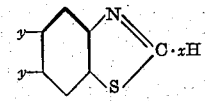

wherein $y$ stands for hydrogen, alkyl, a nitro group or a carboxylic acid group and $x$ stands for an oxygen or sulfur atom, with a phosphorus halogen compound of the formula: P · Hal₅, wherein "Hal" stands for a chlorine or bromine atom, two of which halogen atoms may be substituted by an atom of the group consisting of oxygen and sulfur, at a temperature between 80 and 130° C. with the addition of a solvent.

5. The process which comprises reacting upon a compound of the formula:

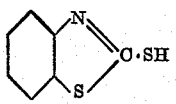

with a phosphorus halogen compound of the formula: P · Hal₅, wherein Hal stands for a chlorine or bromine atom, two of which halogen atoms may be substituted by an atom of the group consisting of oxygen and sulfur, at a temperature between 80 and 130° C.

6. The process which comprises reacting upon a compound of the formula:

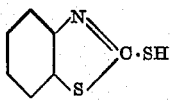

with a phosphorus halogen compound of the formula: P·Hal₅, wherein Hal stands for a chlorine or bromine atom, two of which halogen atoms may be substituted by an atom of the group consisting of oxygen and sulfur, at a temperature between 80 and 130° C. with the addition of a solvent.

7. The process which comprises reacting upon a compound of the formula:

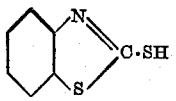

with phosphorus pentachloride at a temperature between 90 and 100° C.

8. The process which comprises reacting upon a compound of the formula:

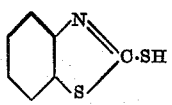

with phosphorus pentachloride at a temperature between 90–100° C. with the addition of phosphorus oxychloride as diluting agent.

In testimony whereof we have hereunto set our hands.

WINFRID HENTRICH.
MAX HARDTMANN.
JOSEF HILGER.
WERNER ZERWECK.